US008271184B2

(12) United States Patent
Gayraud et al.

(10) Patent No.: US 8,271,184 B2
(45) Date of Patent: Sep. 18, 2012

(54) METHOD AND SYSTEM FOR MONITORING AN AIRCRAFT TAXIING PHASE

(75) Inventors: Pascal Gayraud, Toulouse (FR); Nicolas Marty, Saint Sauveur (FR); Bernard Dubourg, Le Haillan (FR); Francois Michel, Saint Medard en Jalles (FR)

(73) Assignee: Thales, Neuilly sur Seine (FR)

( * ) Notice: Subject to any disclaimer, the term of this patent is extended or adjusted under 35 U.S.C. 154(b) by 352 days.

(21) Appl. No.: 12/582,616

(22) Filed: Oct. 20, 2009

(65) Prior Publication Data

US 2010/0114922 A1 May 6, 2010

(30) Foreign Application Priority Data

Oct. 22, 2008 (FR) ..................................... 08 05841

(51) Int. Cl.
*G06F 19/00* (2011.01)

(52) U.S. Cl. .............. 701/120; 701/3; 701/301; 701/16; 701/14; 340/958; 340/961; 340/972; 342/29; 342/36; 342/454

(58) Field of Classification Search .................. 701/120, 701/3, 301, 16, 206, 14, 121; 340/958, 961, 340/972; 342/29, 36, 454
See application file for complete search history.

(56) References Cited

U.S. PATENT DOCUMENTS

| | | | | |
|---|---|---|---|---|
| 6,694,249 | B1 | 2/2004 | Anderson et al. | |
| 7,567,187 | B2 * | 7/2009 | Ramaiah et al. | 340/945 |

FOREIGN PATENT DOCUMENTS

| | | | |
|---|---|---|---|
| FR | 2 891 644 | A | 4/2007 |
| FR | 2 891 646 | A | 4/2007 |

* cited by examiner

*Primary Examiner* — Thomas Black
*Assistant Examiner* — Luke Huynh
(74) *Attorney, Agent, or Firm* — LaRiviere, Grubman & Payne, LLP

(57) ABSTRACT

The invention relates to the field of monitoring and aid to taxiing of an aircraft at an airport.
The invention is a method of checking and monitoring the taxi plan and relates to a monitoring system comprising means for checking the pathway of the plan and means for signalling on the taxi aid the waiting time for the next clearance ahead of the aircraft along the pathway, the means for checking the pathway comprising a device for checking the pathway constraints and a device for checking the clearances, the device for checking the constraints making it possible to test and to display on the taxi plan the information descriptive of the constraints and the device for checking the clearances making it possible to check the clearances and to add the missing clearances to the taxi plan.

6 Claims, 4 Drawing Sheets

METHOD AND SYSTEM FOR MONITORING AN AIRCRAFT TAXIING PHASE

PRIORITY CLAIM

This application claims priority to French Patent Application Number 08 05841, entitled Method and System for Monitoring an Aircraft Taxiing Phase, filed on Oct. 22, 2008.

FIELD OF THE INVENTION

The field of the invention is that of monitoring and aid afforded to the pilot in the phase during which an aircraft is rolling over the ground at an airport.

BACKGROUND OF THE INVENTION

The complexity of the large airport platforms associated with considerable and rapidly growing traffic, is making the taxiing phase into an increasingly tricky phase for pilots notably when they have limited experience of this airport and its constraints. The pilot must manoeuvre the aeroplane along a pathway comprising numerous intersections whilst monitoring the traffic, while complying with the controller's taxi authorizations, usually called clearances, and while making preparations for takeoff. This may lead to errors of assessment, and the aeroplane may be in zones where it is not authorized, entailing risks of collisions.

In modern aircraft, to ensure the airport navigation function, two types of systems exist for aiding traffic flow on the ground. These are:

- A navigation aid system allowing the pilot, on the one hand, to ascertain the position of the aircraft in the airport at any moment, on the other hand, to indicate to him which path to follow to get from one point to another on the airport. Generally the useful information is exhibited on a so-called head-down instrument panel display. This information comprises: a mobile electronic map of the airport, the position of the aircraft on the manoeuvring area of the airport, the taxi pathway to be followed and the stop points, the latter correspond to the taxi authorizations provided by ground control.
- A taxi aid system allowing the pilot to follow, as closely as possible, the preset trajectory coming from control. In the latter case, useful information is presented on a head-up collimator also called an HUD, the acronym standing for Head-Up Display. A head-up collimator conventionally comprises a source of images generating a symbology, collimation optics and an optical combiner placed in the pilot's visual field. The collimator thus gives an image at infinity of the symbology overlaid on the outside landscape. The taxi aid can also be displayed on the head-down displays.

The symbology gives information on the trajectory to be followed and a certain number of presets. It is generated by a computer dedicated to the collimator. In the case of the system for aiding taxiing, the information is provided to the computer of the collimator by:

The main navigation system, notably in respect of the information regarding heading, speed over the ground and position for example.

The airport navigation computer providing the preset data originating from the taxi pathway.

Currently, within the framework of the airport phases, the distribution of the on-board/ground control responsibilities, the operational procedures, the density of the traffic and the considerable number of parties on the airport platform do not enable an aircraft to employ equipment having the capacity to assimilate all the information in order to move in an optimal manner.

The construction of the "taxi plan" is heavily imposed by the ground control authority or "ATC", the acronym standing for the expression Air Traffic Control and is often incremental and partial as a function of the various control zones distributed over the airport. For example, on international airports of large expanse, such as Paris Charles De Gaulle, one controller is in charge of the zone of the runways, a second in an airport zone (e.g.: South West part) of the taxiways and a third in another zone possibly being a platform manager. The pathway is then dictated to the pilot as he advances. He stops at the limits of each control zone and cannot travel the whole way, from the runway to the boarding gate (or the reverse journey).

The problem with the construction of the taxi plan is that it may then be erroneous or that it may lack information, notably stop points to wait for authorizations.

Airport mapping systems exist, such as for example those present in EFBs, the acronym standing for Electronic Flight Bag, OANS, On Board Airport Navigation System, a device specific to the Airbus aircraft manufacturer. These systems make it possible:

- To display the map of the airport showing the position of the aircraft and its situation with respect to the topology of the airport and to the surrounding structures,
- To obtain information on "airport items" by way of the user interface,
- To obtain annotations, advice (e.g. "Approaching Runway").

But these functions ensure only limited monitoring, relying as they do exclusively on databases describing the geometry of the airport with respect to the current position of the aeroplane, and not to the rules of use dictated (and modified periodically) by the local control authorities and specifically established over the pathway envisaged by the aeroplane.

Finally certain functions, such as the "RAAS", the acronym standing for the expression Runway Awareness and Advisory System from Honeywell, available through the product EGPWS, have the role of warning the crew when approaching a runway. They are based on the sole information about the runways, independently of the possible connections to the taxiways or of their actual activity. Moreover, the segregation of the equipment used during the taxiing phases, prevents these messages from being correlated with pathway information formulated through a routing means or a richer database having all the information about the airport surface.

U.S. Pat. No. 6,694,249 from Rockwell Collins is also known. This document deals with the aspect regarding display of the airport map, clearances and calculation of the suitable speed, but does not tackle pathway monitoring and clearances monitoring.

SUMMARY OF THE INVENTION

The aim of the invention is to improve the safety of the taxiing phases by verifying the taxi plan with respect to the data contained in the various onboard databases, and by notifying the pilot of the result of these verifications. Moreover, this method verifies whether the essential clearances exist in the taxi plan. If this is not the case, it proposes to the pilot that these clearances be inserted into the taxi plan.

More precisely, the invention is a method of monitoring the pathway of the taxi plan of an aircraft comprising a monitoring system comprising a system for formulating a taxi plan consisting of taxi elements of the airport and display devices for aiding taxiing; with each taxi element can be associated a taxi authorization and pathway constraints to be complied with, the taxi authorizations being stored in an "AUTH" and NOTAM database and the pathway constraints in an "AEROPORT" and "NOTAM" database, the said databases being updatable by ground/on-board communication, characterized in that the method carries out subsequent to the formulation of the taxi plan provided to it a first phase of checking the pathway comprising at least one of the following steps:

a) Testing the constraints of the pathway of the taxi plan with those contained in the AEROPORT and "NOTAM" database and displaying on the taxi aid information descriptive of the constraints, b) Testing the authorizations of the taxi plan with those contained in the "AUTH" and NOTAM database and displaying on the taxi aid missing authorizations, and then while the aircraft is executing the taxi plan, the method carries out throughout the taxi plan, a second phase of monitoring the taxi authorizations comprising the following successive steps:

c) Determining the active taxi element and checking whether it belongs to the taxi plan, d) Monitoring and signalling, on the taxi aid display devices, the waiting time for the next authorization to taxi ahead of the aircraft of the active taxi element.

The invention is advantageous in the sense that it allows the taxi constraints to be taken into account rapidly so as to signal them to the pilots in an opportune manner, thereby avoiding a search through the airport documentation. Moreover, the item of information resulting from the verification of the taxi plan is adapted according to the aircraft's proximity to the element. The display for aiding taxiing describes on the taxi plan the pathway constraints associated with the taxi elements along the pathway. Another advantage resulting from the monitoring method is the detection of erroneous taxi plan thus improving the safety of taxiing on the airport zone.

Advantageously, the step of monitoring the taxi authorizations d) comprises the following substeps: determination of the next taxi authorization of the active taxi element, announcement of the taxi authorization and of the time required to reach it, display on the taxi aid of an overstepping alert signalling when the aircraft is in an immediate proximity to the taxi authorization. The method also formulates a signalling to the pilot of the next clearance intervening subsequently in the taxi plan. This signalling is of alert type if the aircraft is located in immediate proximity to a clearance and of recommendation type if the aircraft is close to a clearance. This clearance monitoring advantageously makes it possible to avoid stopping the aeroplane unnecessarily at the clearance stop point, by allowing better anticipation, which may then be a source of fuel saving.

Advantageously, when step c) detects that the aircraft is located on a taxi element not belonging to the taxi plan, the method carries out the following steps: display on the taxi aid of an alert presenting the discrepancy of the location of the aircraft with respect to the pathway plan, step a) of testing the pathway constraints of the active taxi element, step b) of testing the taxi authorizations for the active taxi element and step d) of monitoring the taxi authorization of the active taxi element. Thus the invention makes it possible to detect any straying of the aircraft from the taxi plan and to signal the constraints and clearance ahead of the aircraft which had not initially been envisaged.

Advantageously, for step a) of checking the constraints of the pathway, the pathway constraints comprise the traffic flow procedures and the traffic size restrictions to be complied with on the taxi elements of the taxi plan.

Advantageously, for step a) of checking the constraints of the pathway, the method verifies that the successive taxi elements are connected together.

Advantageously, for step a) of checking the constraints of the pathway, the method verifies that the taxi elements comprise a taxi line.

Advantageously, for step a) of checking the constraints of the pathway, the method verifies the current aircraft parameters of the plane, these aircraft parameters being at least the mass of the aircraft, the speed of the aircraft and the dimensions of the aircraft.

Advantageously, the means for signalling the next authorization to taxi ahead of the aircraft comprise: a device for determining the airport taxi element on which the aircraft is positioned and a monitoring device for calculating the waiting time for the next authorization to taxi ahead of the aircraft and for displaying this waiting time on the taxi aid.

Advantageously, the monitoring device also comprises an alert means for signalling on the taxi aid a taxi authorization when the aircraft is in an immediate proximity to the stop point of the said authorization.

The invention will be better understood and other advantages will become apparent on reading the nonlimiting description which follows and by virtue of the appended figures among which:

BRIEF DESCRIPTION OF THE DRAWINGS

FIGS. 2 and 3 represent the navigation aid and the taxi aid for one and the same taxi plan.

DETAILED DESCRIPTION OF PREFERRED EMBODIMENT

Figure 1:
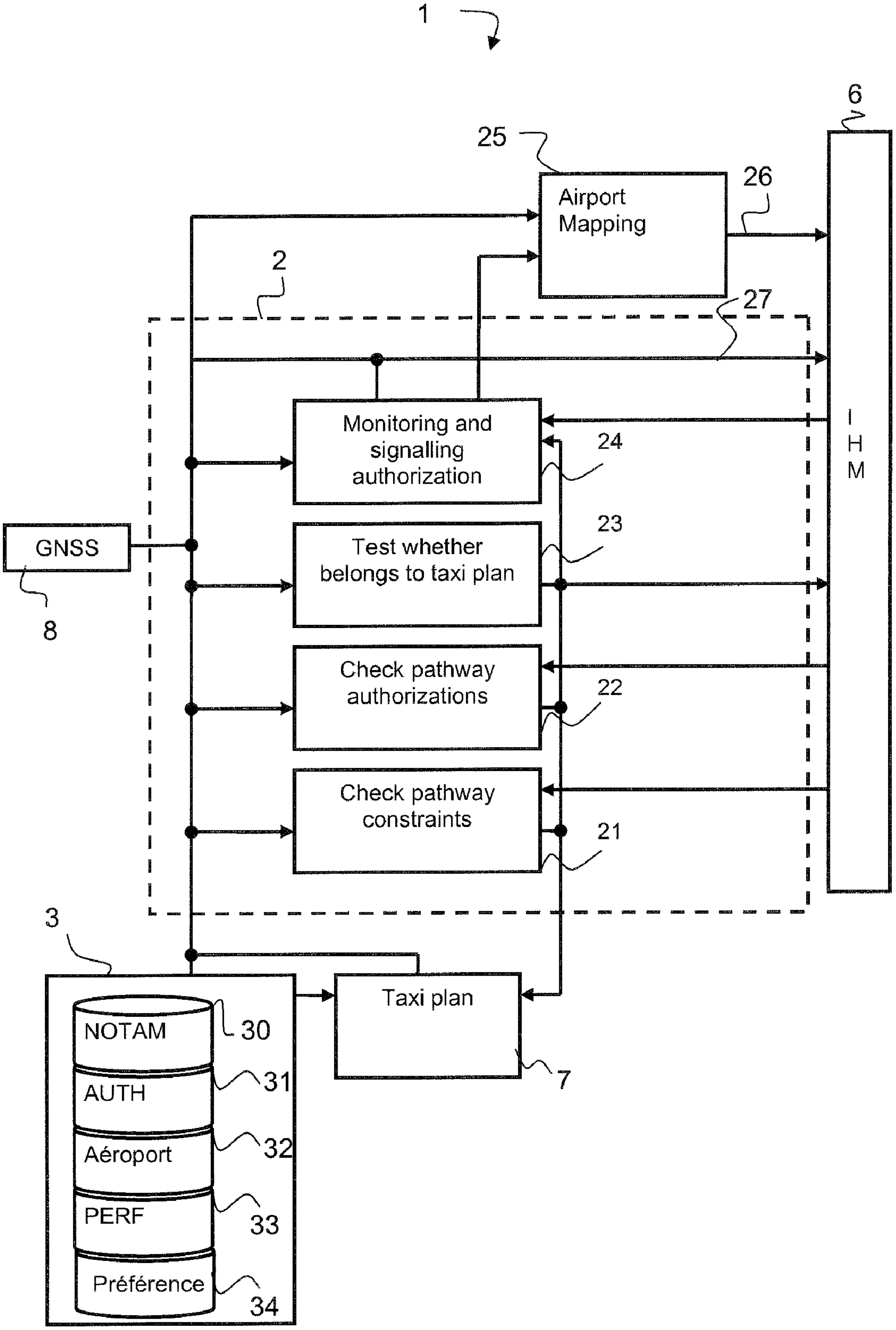
FIG. 1 represents the monitoring system as well as the main functions of the method and the avionics devices making it possible to implement the monitoring method.

The first part of the description presents the hardware architecture, shown diagrammatically by FIG. 1, on which the monitoring method relies. The objective of this first part is to describe the data manipulated for the monitoring application and the systems producing these data. A second part of the description subsequently describes the functions of the monitoring system making it possible to aid the pilot in the management of the taxiing phase.

The pathway monitoring system 1 comprises a calculation device 2 comprising checking devices 21 to 24 implementing the monitoring functions of the monitoring method. For the formulation of these functions, the calculation device is connected to a database system 3, to a man-machine interface device 6 (MMI), to a taxi plan formulation device 7 and to a geo-location device 8.

The function of the MMI 6 is to present to the crew the taxi plan of the aircraft from the boarding zone to the takeoff runway during the takeoff phase and the taxi plan of the aircraft from the landing runway to the passenger disembarkation zone during the landing phase. The role of the MMI 6 is also to present to the crew the messages and alerts relating to the taxi plan, notably the clearances intervening along the pathway and the messages originating from the ATC. The MMI 6 comprises a user interface which comprises an input interface or "Interactive CDS" such as for example a "track ball", a cursor, or a keyboard, etc, and an output interface, typically a CDS, the acronym standing for cockpit display system. The system for aiding navigation while taxiing presents the information on a HUD for the display of the pathway and on a viewing screen for the cartographic display. For the generation of the sound and auditory alerts, it also comprises a system of loudspeakers and visual indicators. The MMI 6 is linked directly to the calculation device 2.

Figure 2:
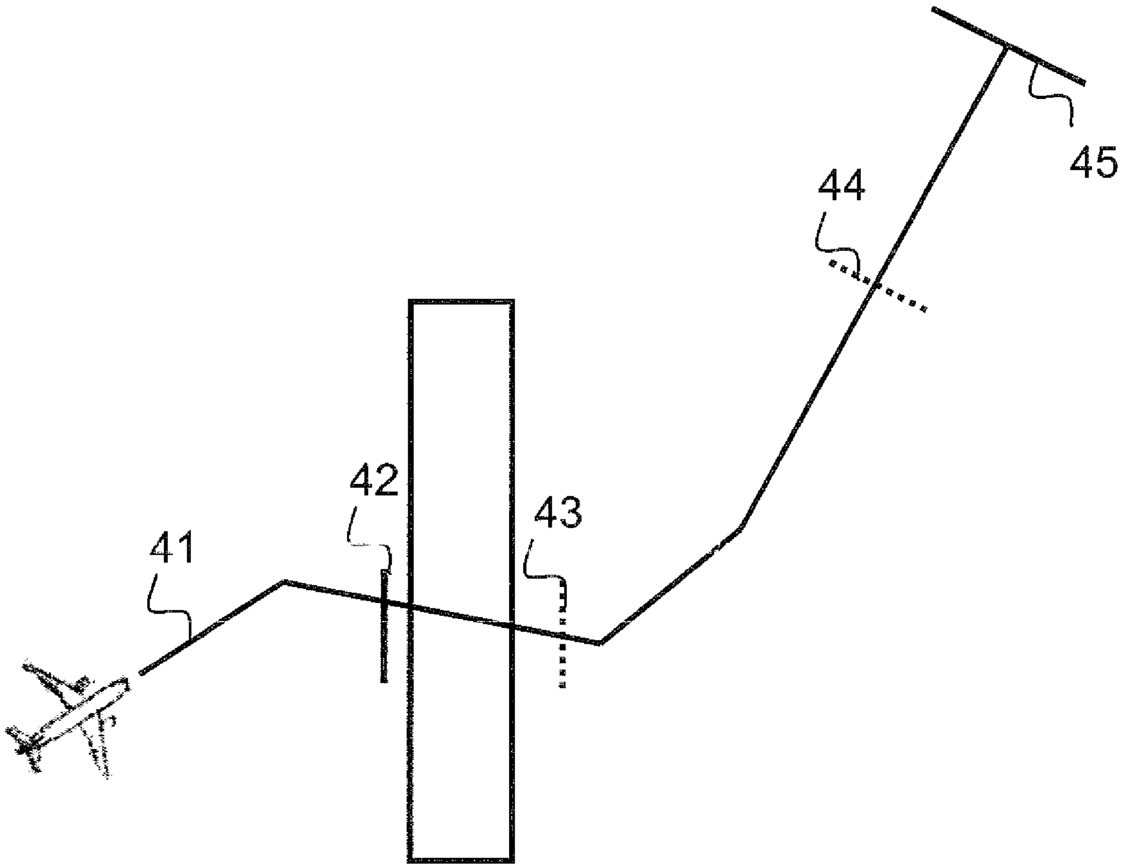
FIG. 2 illustrates a display for aiding navigation on an airport zone of an instrument panel display. This navigation aid allows the crew to view the pathway of the taxi plan of an aircraft. The display comprises the initial stop points for waiting for authorizations and those added by the monitoring system.

The monitoring system 1 comprises a taxi plan calculation device 7. The taxi plan is constructed using various databases 30 to 34. The system according to the invention comprises a databases system 3 which mainly comprises five databases relating to airport information:

A taxi plan, illustrated by FIG. 2, comprises a cross section of taxi elements 41. A mapping of the airport zone presents the crew with all the elements catalogued in an airport database 32 and/or updated as a function of the active NOTAMs 30, NOTAM being the acronym standing for the expression NOtice To AirMen. The NOTAM base 30 contains the advice giving with regard to the establishment, the state or the modification of an aeronautical installation, of a service of a procedure, or of a danger for aerial navigation, details that it is essential to communicate when timely to the personnel charged with the air operations. Preferably, this base is updated by Datalink communication.

The "Airport" base 32 describes the mapping of the airport such as standardized in the ARINC-816 document. It contains in particular the location of all the visual elements and their attachment to a physical entity of the airport through a container, such as a taxiway or a runway for example. The set of containers and elements included in the database are described in ARINC-816. Beyond the simple grouping of the data into containers, the base used ensures the connectivity chaining of the airport elements.

The "AUTH" procedures base 31 contains the taxiing rules defining the correspondence between the elements of the airport and the procedures associated with the control points. The "AUTH" base describes the set of procedures applicable on the airport zone which can evolve over time, independently of the geometry of the airport. This base is therefore updated independently of the Airport base and with different periodicities, optionally through the ground-onboard link for updating the NOTAMs. It is designed to contain:

- the restrictions on movement over the set of structures of the airport (one-way as a function of the runway in service, limitations of size/weight, repair works, etc.)
- the taxi procedures defined as operations between control points (stopbars, boarding gates, runway, holding zones, parking bays, etc.) or precisely located reference points,
- the paths or pathway routes favoured by the authorities for managing the airport, defined as series of taxi procedures with the particular restrictions on the elements (the itineraries in poor visibility for example, the maximum taxiing speeds, etc).

The monitoring system also receives by Datalink the runways used for landing and takeoff and the departure and arrival procedures of the day and the ATIS information (visibility conditions, landing and takeoff).

The database system 3 furthermore comprises a "PERF" database 33 specific to the aircraft which contains models of aircraft mass, and dimension for example serving for the pathway tests.

The database of the preferences of the company 34 makes it possible to simplify the procedures for negotiating the pathway with the ATC. Indeed, airline companies are often allocated a terminal, or a terminal zone and can then expect to define in a single base for all the company's planes, the favoured routes for getting from their terminal to the various runways, in accordance with the favoured routes published by each airport. This base describes in particular:

- the description of the pathways joining up with the parking zones generally allocated to the company and the pathways favoured by the airport,
- statistics of the mean times for airport gate/runway movements, that is to say all the information judged useful to crews for managing taxiing or for preparing flights (telephone numbers, location of the structures for receiving the crews).

The monitoring system is linked at input to a geo-location device 8 able to ensure a location function compatible with the monitoring and guidance requirements, notably in terms of precision of location, typically of the order of 1 m. Indeed, location of simple GPS type, with a precision of about 10 m, does not make it possible to guarantee the positioning of the aircraft on the appropriate element of the airport. Improving the measurement of position relies on:

- sensors (GALILEO, WAAS, EGNOS), "WAAS" the acronym standing for the expression Wide Area Augmentation System being a wide-zone improvement system, as opposed to local systems based on differential measurements with respect to a known point, "EGNOS" the acronym standing for the expression European Geostationary Navigation Overlay System being the European version of WAAS;
- measurement algorithms taking account of conditions suited to ground navigation (elimination of low-orbit satellites, etc.),
- The location system also provides the flight parameters, notably the speed, the heading etc.

The monitoring system 1 comprises means 21 and 22 for checking the pathway of the taxi plan formulated by the taxi plan calculation system 7 and means 23-24 for signalling the waiting time for the next authorization to taxi ahead of the aircraft along the pathway. The means for checking the pathway comprise a device for checking the pathway constraints 21 and a device for checking the taxi authorizations 22, the device for checking the constraints 21 making it possible to test and to display on the taxi plan 52 the information descriptive of the constraints 54-55 and the device for checking the taxi authorizations 22 making it possible to check the missing taxi authorizations 56-57 and to add them to the taxi plan 53. The calculation devices 21 to 24 preferably belong to a common computer 2.

The aim of this second part of the description is to describe the calculation functions intervening in the method for monitoring the taxi plan. Once the taxi plan is established, to achieve the aircraft's pathway, the calculation device 2 of the monitoring system 1 formulates four functions for implementing the method according to the invention.

A first function carried out by the checking device 21 checks the constraints of the pathway of all the taxi elements of the taxi plan, in the case where a taxi plan is provided as input data by the taxi plan calculation function 7, and displays the information descriptive of the said constraints. The term pathway constraint is understood to mean first of all the consistency of the taxi plan in the construction of its elements. Indeed, two successive taxi elements of the taxi plan must be connected. It is also understood to mean the consistency of the functions of the elements in the taxi plan. An element of the taxi plan must necessarily comprise a Taxiline. And it is also understood to mean the consistency of the elements of the taxi plan with the aircraft-related constraints. The function can also execute the checking of the pathway constraints on a single taxi element when a single element is provided as input data.

This pathway checking function then consists in verifying for each element of the pathway the following points:

Test whether the element has a connection with the following element of the taxi plan: this test makes it possible to verify the consistency of connectivity of the elements of the taxi plan.

Test whether the element contains a Taxiline: a taxi element not containing any Taxiline cannot belong to a taxi plan.

Test whether the elements do or do not belong to the NOTAM base: this test is addressed notably at temporary prohibitions of traffic flow on the said element.

Test with respect to the D-OTIS data: this test checks the consistency of the taxi plan with respect to the runway in service for landing and takeoff.

Test with respect to the taxi procedure base while taking the aircraft configuration data into account:

Taxiing direction authorized

Prohibition to park on the element

Pathway between taxi elements not authorized

Taxi procedures defined by poor visibility

Particular preset on the element

Test whether with respect to the aircraft mass of the performance file and with respect to its current mass, the aircraft is authorized to taxi on the element.

Test with respect to the dimensions of the aircraft whether the latter can travel along the element.

Test of the predicted or current speed on the element with respect to the taxiing speeds of the databases.

The function for checking the constraints of the pathway of the taxi plan comprises as input the data formulated by the device for calculating the taxi plan 7, the data relating to the airport and its procedures (that is to say the data originating from the airport base, from the NOTAM base), the data of the PERF base 33 and the flight parameters data originating from aeronautical sensors.

The checking function provides as output, for each element of the taxi plan, a list of the negative tests and the related item of information describing the result of the tests. These items of information are displayed on one of the displays of the MMI 6.

A second function carried out by the checking device 22 checks the clearances of the pathway of the taxi plan, inserts on the taxi plan the stop points relating to missing clearances and displays descriptive information. During the formulation of the taxi plan, the clearances relating to this taxi plan can either be selected manually by the operator, or arise from Datalink data or be inserted automatically by the system. In the first case and the second case, it is possible that clearances may have been omitted and the objective of the clearances checking function is to detect those that are missing and to insert them.

The verification of the clearances relies on the preference databases 33, the airport database 32 and the AUTH database. The monitoring system then ensures that all the clearances of the taxi plan are present and in the converse case inserts the missing stop points on the taxi plan with an item of information descriptive of the clearance. These stop points are symbolized on the navigation aid display by "stopbars".

Figure 3:
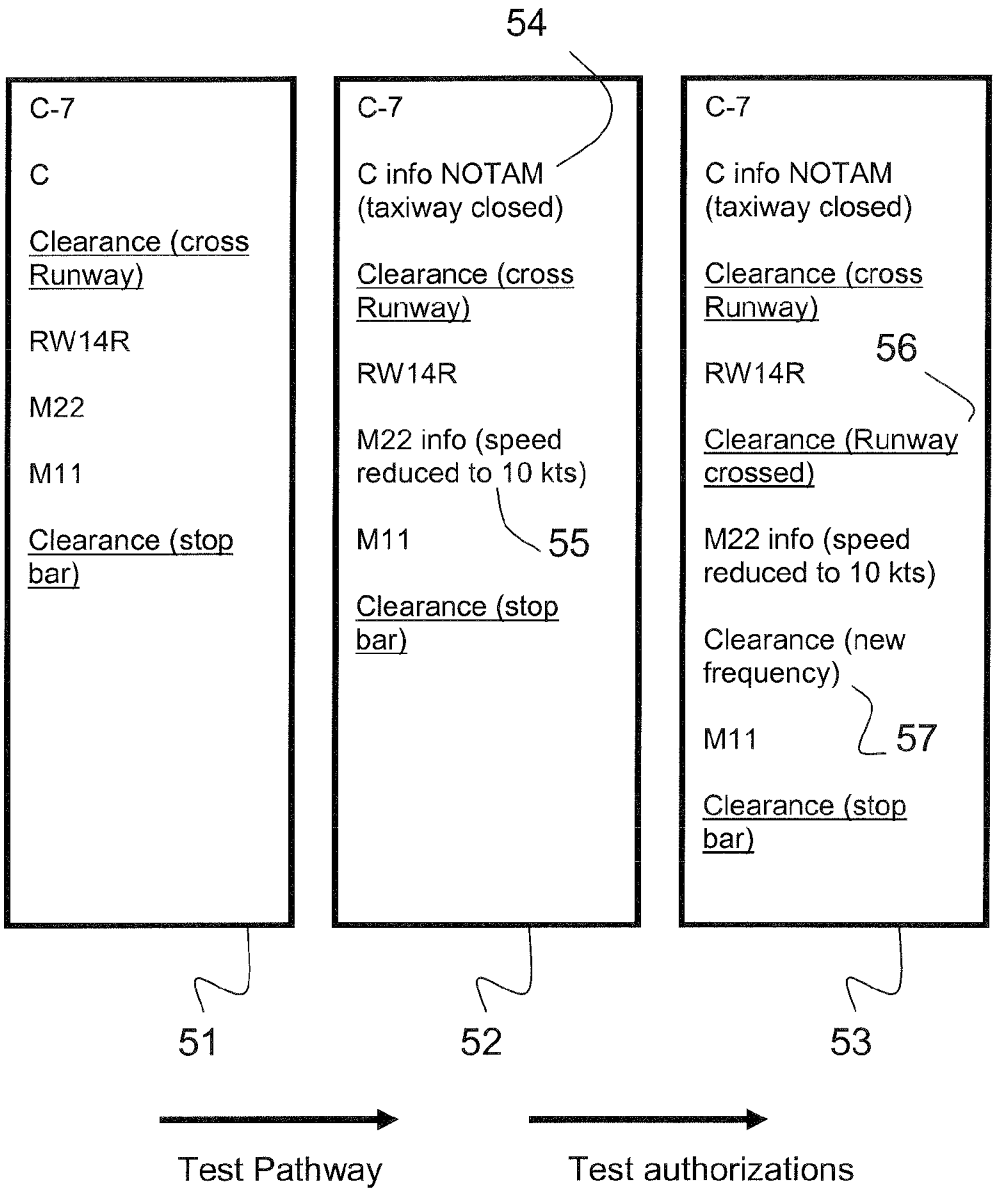
FIG. 3 illustrates a taxi aid display. This figure represents the modifications of the taxi plan intervening after carrying out the functions for checking the pathway and the clearances.

FIG. 3 illustrates the display for aiding navigation on the taxi plan. This navigation aid comprises inserted "stopbars" 43 and 44 which did not initially exist. By way of nonlimiting example, the clearances tested and added relate to authorizations and checking of:

The end of the taxi plan 45 if the latter exists,

The entry of an element announced as non-usable by the pathway verification function, An element positioned on an aircraft deicing zone, The ILS protection during poor-visibility procedure, A runway crossing entry 42, A runway crossing exit 43, An element emerging onto a runway access, A change-of-frequency zone 44, A compulsory report defined on particular points by the authorities.

FIG. 3 represents a taxi plan whose pathway and clearances have been checked by the monitoring system. It describes the initial taxi plan 51, the taxi plan 52 after checking the pathway and the taxi plan 53 after checking the clearances. After checking the pathway, the monitoring system displays on the taxi aid display information regarding constraints related to elements of the taxi plan. For example, on the element C indicated on the taxi aid, the monitoring method adds an additional item of information 54 specifying that the taxiway is closed. On the element M22, the monitoring method displays an indication of speed constraint 55 on this taxiway portion.

A third function carried out by the checking device 23 makes it possible, based on the location of the aircraft provided by the geolocation means 8, to determine the taxi plan element on which the aircraft is positioned along the pathway and tests for whether it belongs to the taxi plan. In the case where the pilot causes the aircraft to deviate from the taxi plan, the function 23 warns the crew.

When the monitoring system detects the airport element of the taxi plan on which the aircraft is located, the monitoring method determines the next following clearance of the taxi plan and on the basis of the aircraft parameters, notably the current speed of the aircraft, the system evaluates the time required to reach the clearance. A fourth function carried out by the checking device 24 is responsible for monitoring the clearances in accordance with the aircraft's current position and is charged with signalling it to the crew.

Figure 4:
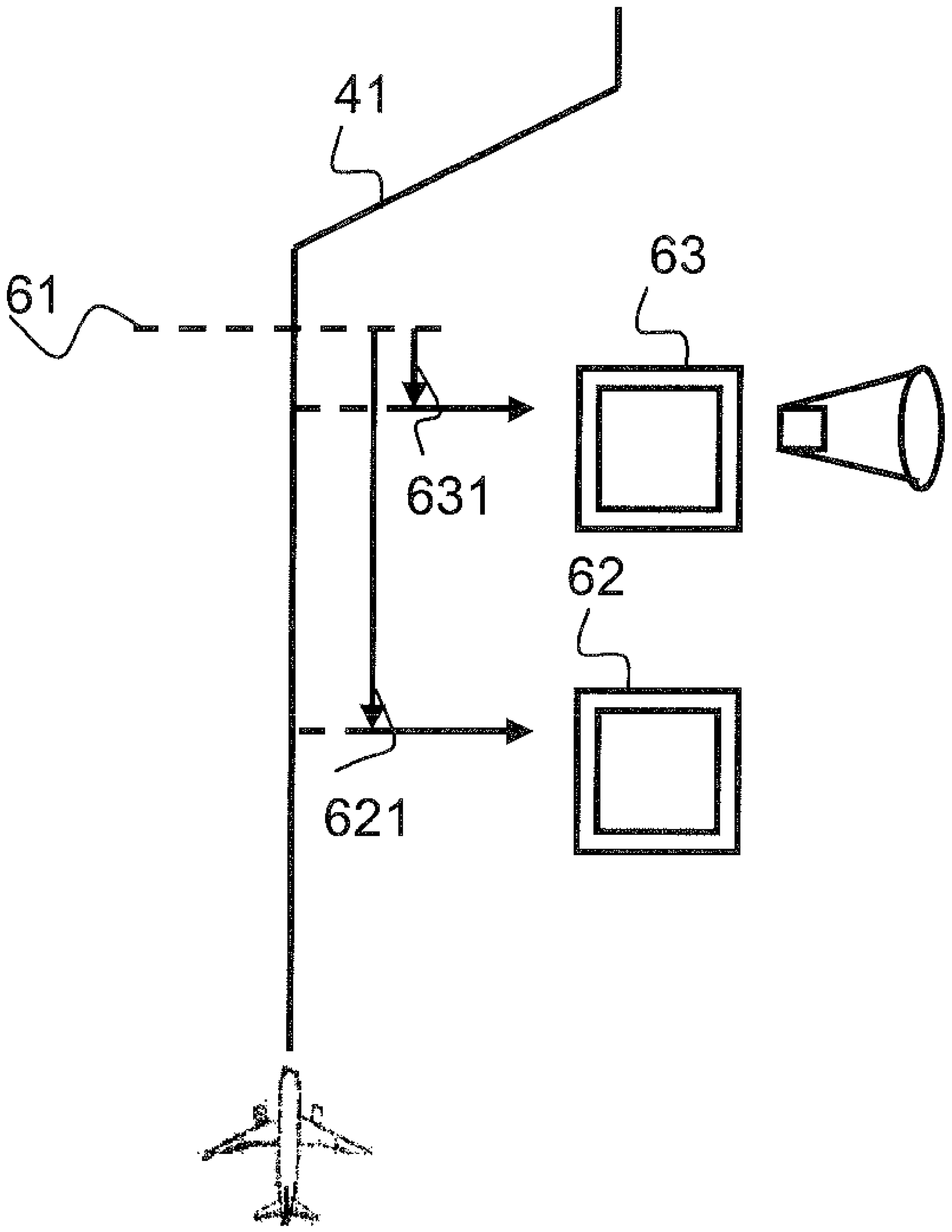
FIG. 4 illustrates the monitoring method and the presentation of the alerts messages formulated in relation to a clearance.

Clearance announcement distances are calculated on the basis of the aircraft's performance data 33 and of the aircraft's current speed included in the flight parameter data 5. Two announcement distances 621 and 631 are calculated with a view to displaying two types of messages 62 and 63 to the crew so as to signal the clearance. FIG. 4 represents an exemplary signalling of the next clearance of the taxi plan ahead of the aircraft. For each taxi element over which the aircraft rolls, the system for aiding navigation for the pathway indicates the clearance by a stopline 61 and announces it on the taxi aid display.

The first announcement distance 621 calculated makes it possible to detect a point of the pathway onwards of which the monitoring system displays the time 62 required to reach the clearance. This time is displayed by a message on the navigation aid and is reupdated until the pilot has acknowledged the clearance. The acknowledgement corresponds to the manipulation enabling the pilot to warn that he has taken the clearance into account. Preferably, this message is of recommendation type and its role is to signal to the pilot the presence of a stop point related to a hold for awaiting authorization. In this way, the pilot has information regarding taxiing enabling him to anticipate the stop point and the closing rate.

The objective of the second announcement distance 631, shorter than the first distance 621, is to generate an alert message for the crew forewarning of the presence of a clearance immediately ahead of the aircraft. By way of example, the message 63 generates a message on the navigation aid of the type: "Do not overstep clearance". The system can also generate audible alerts.

Preferably, the distance 631 is of a length allowing the pilot to react and to halt the aircraft before overstepping the clearance-related stop point. The distances 621 and 631 are calculated on the basis of a performance chart stored in the PERFO database.

For the execution of the monitoring method, the steps of carrying out the functions can be performed according to various modes of implementation. The method comprises two main phases: a first phase of checking the taxi plan once the latter has been formulated or modified, and a second phase of monitoring the clearances of the taxi plan in real time along the pathway.

By way of example, the first function carried out by the checking device 21 and the second function carried out by the checking device 22, for the first phase of checking the taxi plan or of the phase of checking a taxi element, can be carried out subsequently whatever the order. The method can also carry out just one of the two functions. Preferably, the monitoring method initially checks the pathway and thereafter the clearances. It is also possible for the operator to force the tests carried out by these two functions so as to avoid disabling the system or displaying erroneous information. Once the taxi plan has been checked, the method carries out the second phase of monitoring the clearances of the taxi plan by locating the aircraft on the taxi plan and by determining the taxi element on which the aircraft is positioned. The system thereafter determines the next clearance according to the position of the aircraft along the aircraft's pathway on the taxi plan.

If the pilot causes the formulation of a new taxi plan along the pathway, the monitoring method carries out once again the first phase of checking the pathway and clearances on the new taxi plan and thereafter carries out the phase of monitoring the clearances of the taxi plan. If the aircraft strays from the taxi plan, the monitoring method determines the taxi element on which the aircraft is positioned, by means of the function carried out by the checking device 23, carries out a check of the pathway, by means of the function carried out by the checking device 21, and a check of the clearances of the taxi element, by means of the function carried out by the checking device 22, and thereafter signals the next clearance present ahead of the aircraft, by means of the function carried out by the checking device 24. The monitoring system also alerts the pilot that the aircraft has exited the taxi plan and displays in real time the position discrepancy. The system advantageously makes it possible to signal to the pilot the pathway clearances and constraints related to a taxi element which had not initially been envisaged in the taxi plan.

The invention applies to systems for aiding taxiing for aircraft on airport zones. It makes it possible to take account of the taxiing information originating from the ATC and to check that it has been taken account of in the taxi plan.

The invention claimed is:

1. Method of monitoring the pathway of a taxi plan of an aircraft comprising a monitoring system comprising a system for formulating a taxi plan comprising taxi elements of an airport and display devices for aiding taxiing; with each taxi element can be associated a taxi authorization and pathway constraints to be complied with, the taxi authorizations being stored in an "AUTH" and NOTAM database and the pathway constraints in an "AEROPORT" and "NOTAM" database, the databases being updatable by ground/on-board communication, wherein the method carries out subsequent to the formulation of the taxi plan provided to it a first phase of checking the pathway comprising at least one of the following steps:

a) Testing the constraints of the pathway of the taxi plan with those contained in the AEROPORT and "NOTAM" database and displaying on the taxi aid information descriptive of the constraints;

b) Testing the authorizations of the taxi plan with those contained in the "AUTH" database and "NOTAM" and displaying on the taxi aid missing authorizations, and then while the aircraft is executing the taxi plan, the method carries out throughout the taxi plan, a second phase of monitoring the taxi authorizations comprising the following successive steps:

c) Determining the active taxi element and checking whether it belongs to the taxi plan; and d) Monitoring and signaling on the taxi aid display devices the waiting time for the next authorization to taxi ahead of the aircraft of the active taxi element, wherein the monitoring further comprises:

i. Determination of the next taxi authorization of the active taxi element;

ii. Announcement of the taxi authorization and the time required to reach it; and iii. Displaying on the taxi aid an overstepping alert signaling when the aircraft is in an immediate proximity to the taxi authorization.

2. Method according to claim 1, wherein for step a) of checking the constraints of the pathway, the method verifies the current aircraft parameters of the plane, these aircraft parameters being at least the mass of the aircraft, the speed of the aircraft and the dimensions of the aircraft.

3. Method according to claim 1, wherein when step c) detects that the aircraft is located on a taxi element not belong to the taxi plan, the method carries out the following steps:

Display on the taxi aid of an alert presenting the discrepancy of the location of the aircraft with respect to the pathway plan, Step a) of testing the pathway constraints of the active taxi element, Step b) of testing the taxi authorizations for the active taxi element, Step d) of monitoring the taxi authorization of the active taxi element.

4. Method according to claim 1, wherein for step a) of checking the constraints of the pathway, the pathway constraints comprise the traffic flow procedures and the traffic size restrictions to be complied with on the taxi elements of the taxi plan.

5. Method according to claim 1, wherein for step a) of checking the constraints of the pathway, the method verifies that the successive taxi elements are connected together.

6. Method according to claim 1, wherein for step a) of checking the constraints of the pathway, the method verifies that the taxi elements comprise a taxi line.

* * * * *